United States Patent
Kwon et al.

(10) Patent No.: US 12,301,145 B2
(45) Date of Patent: May 13, 2025

(54) TWO-PHASE MOTOR ASSEMBLY

(71) Applicant: LG Electronics Inc., Seoul (KR)

(72) Inventors: Sunku Kwon, Seoul (KR); Chaseung Jun, Seoul (KR); Jaehoon Jeong, Seoul (KR); Jungik Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 121 days.

(21) Appl. No.: 18/009,585

(22) PCT Filed: Jun. 18, 2020

(86) PCT No.: PCT/KR2020/007898
§ 371 (c)(1),
(2) Date: Dec. 9, 2022

(87) PCT Pub. No.: WO2021/251536
PCT Pub. Date: Dec. 16, 2021

(65) Prior Publication Data
US 2023/0223882 A1 Jul. 13, 2023

(30) Foreign Application Priority Data
Jun. 10, 2020 (KR) .................. 10-2020-0070305

(51) Int. Cl.
*H02P 6/28* (2016.01)
*H02M 7/5387* (2007.01)
(Continued)

(52) U.S. Cl.
CPC .......... *H02P 27/06* (2013.01); *H02M 7/5387* (2013.01); *H02P 6/085* (2013.01); *H02P 6/28* (2016.02)

(58) Field of Classification Search
CPC ............ H02P 27/06; H02P 6/085; H02P 6/28; H02M 7/5387
See application file for complete search history.

(56) References Cited

U.S. PATENT DOCUMENTS 5,140,246 A * 8/1992 Rarick ............... H05G 1/66
318/400.2
5,146,147 A * 9/1992 Wills ............... H02P 25/04
363/43

(Continued)

FOREIGN PATENT DOCUMENTS

JP H11-155299 6/1999
JP 4284306 6/2009
(Continued)

OTHER PUBLICATIONS

International Search Report and Written Opinion in International Appln. No. PCT/KR2020/007898, mailed on Mar. 9, 2021, 17 pages (with English translation).

*Primary Examiner* — Rina I Duda
(74) *Attorney, Agent, or Firm* — Fish & Richardson P.C.

(57) ABSTRACT

The present disclosure relates to a motor assembly, and more particularly, to a motor having a two-phase input power source and a power conversion device for driving a two-phase motor. The present disclosure relates to the motor assembly for driving the two-phase motor, the motor assembly configured to comprise: a motor including a first winding and a second winding having an electrically insulated parallel structure; a DC-link circuit for supplying a direct-current voltage; and an inverter connected to the DC-link circuit to convert the direct-current voltage into an alternating-current voltage to drive the motor, and including a first switching element set connected to the first winding and a second switching element set connected to the second winding.

15 Claims, 23 Drawing Sheets

(51) Int. Cl.
    *H02P 6/08*    (2016.01)
    *H02P 27/06*   (2006.01)

(56) References Cited

U.S. PATENT DOCUMENTS

| | | | | |
|---|---|---|---|---|
| 5,359,154 A | * | 10/1994 | Tsukasa | H02P 5/50 |
| | | | | 318/749 |
| 5,877,608 A | * | 3/1999 | Corbin | H02P 8/12 |
| | | | | 318/696 |
| 6,121,749 A | * | 9/2000 | Wills | H02P 1/44 |
| | | | | 318/785 |
| 7,821,221 B2 | * | 10/2010 | Kragh | H02P 6/085 |
| | | | | 318/774 |
| 9,979,328 B1 | * | 5/2018 | Chretien | H02P 27/08 |

FOREIGN PATENT DOCUMENTS

| | | |
|---|---|---|
| JP | 2015-220822 | 12/2015 |
| WO | WO 2006/084566 | 8/2006 |

* cited by examiner

TWO-PHASE MOTOR ASSEMBLY

CROSS-REFERENCE TO RELATED APPLICATIONS

This application is a National Stage application under 35 U.S.C. § 371 of International Application No. PCT/KR2020/007898, filed on Jun. 18, 2020, which claims the benefit of Korean Application No. 10-2020-0070305, filed on Jun. 10, 2020. The disclosures of the prior applications are incorporated by reference in their entirety.

TECHNICAL FIELD

The present disclosure relates to a motor assembly, and more particularly to a motor having two-phase input power and a power converter for driving a two-phase motor.

BACKGROUND ART

In general, an inverter, which is a power converter for generating AC power from DC power, is used to drive and control a motor, and a system is configured as single-phase, two-phase, or three-phase for driving and controlling the motor.

In order for a motor and a driving device to be applied to small products such as vacuum cleaners, it is necessary to increase output within a limited volume and improve flow efficiency along with an increase in an operating speed of the motor. In addition, there is a need to increase a motor design capacity that occupies a small volume.

In the case of a single-phase motor, there are limitations such as a relatively low starting capability and inability to start at a specific location, which requires use of a starting capacitor to overcome this.

In particular, when driving a single-phase motor, control characteristics may deteriorate due to DC-Link voltage imbalance.

In addition, electric frequency current of a motor rotational speed component may flow into capacitors at both ends of a DC-link through a neutral point, and as a result, low-frequency large current flows into the capacitor under a low-speed/high-torque condition, causing a lifespan problem of the capacitor.

Moreover, in the case of single-phase motors in general, there is a problem in that it is difficult to apply a design for a high-speed operation.

Therefore, there is a need for a motor and a driving device thereof, for maximizing a voltage utilization rate or increasing the maximum speed to a level of a three-phase motor while using a two-phase motor.

DISCLOSURE

Technical Problem

An object of the present disclosure is to provide a motor assembly for driving a two-phase motor with an advantage of high-speed operation for increasing the maximum speed.

An object of the present disclosure is to provide a two-phase motor assembly for reducing the weight and size of a motor based on the same output and increasing output of the motor compared with the same volume.

Technical Solution

The present disclosure may provide a motor assembly for driving a two-phase motor having an advantage of high-speed operation that increases the maximum speed by maximizing a voltage utilization rate or relieving a limitation of an output voltage of an inverter.

According to the present disclosure, the weight and size of a motor may be reduced based on the same output and the output of the motor relative to the same volume may be increased by applying a high-speed driving scheme.

Therefore, when the present disclosure is applied to a motor of a fan of a vacuum cleaner, the maximum speed of the motor may be increased, thereby achieving high-output and miniaturization of the motor for achieving a high-speed operation and improving suction power of the vacuum cleaner.

To this end, the present disclosure may propose an inverter structure optimized for driving of a two-phase motor and a high-speed operation method therethrough.

According to the present disclosure, provided may be a motor including a first winding and a second winding that have an electrically insulated parallel structure, and an inverter for driving the motor.

In this case, provided may be a first switching device set connected to a first winding and a second switching device set connected to the second winding.

In this case, a phase difference between the first winding and the second winding may be 90 degrees or 270 degrees.

As a detailed example, according to the present disclosure, a motor assembly for driving a two-phase motor includes a motor including a first winding and a second winding that have an electrically insulated parallel structure, a DC-link circuit for supplying a DC voltage, and an inverter connected to the DC-link circuit, converting the DC voltage into an AC voltage to drive the motor, and including a first switching device set connected to the first winding and a second switching device set connected to the second winding.

Current applied from the inverter to the first winding and the second winding of the motor may be asymmetrical.

The motor may not include a neutral point.

The DC-link circuit may include a neutral point.

The two-phase motor assembly may further include a controller for controlling the inverter.

The controller may operate a first phase of the motor using the neutral point and a half-bridge and operate a second phase using a full-bridge.

The controller may include a speed controller for generating a target current based on a speed of the motor, and a torque controller for generating a torque command of the motor based on the target current and differently controlling distribution of two-phase torque depending on a speed of the motor.

In a region with a first speed or less of the motor, the torque controller may apply a torque command half of a torque requested by a load of the motor to each of a first phase and a second phase, and in a region with the first speed or greater and a second speed or less, the torque controller may apply different torque commands to the first phase and the second phase.

The torque controller may perform weak field control on the first phase up to a $(1\text{-}1)^{th}$ speed greater than the first speed and lower than the second speed, and apply a torque command obtained by subtracting an output torque in the first phase from the torque requested by the load to the second phase.

The torque controller may turn off the first phase and apply a torque command corresponding to a torque of the load up to the second speed greater than the $(1\text{-}1)^{th}$ speed.

The torque controller may turn off the first phase and perform weak field control on the second phase up to a $(2-1)^{th}$ speed greater than the second speed.

The first speed may be a maximum torque of the first phase motor or a maximum speed for reaching a current value corresponding to the maximum torque.

The second speed may be a maximum torque of the second phase motor or a maximum speed for reaching a current value corresponding to the maximum torque.

The first switching device set and the second switching device set may include different numbers of switching devices.

The first switching device set may include one pair of switching devices, and the second switching device set may include two pairs of switching devices.

Advantageous Effects

They present disclosure may have the following effects.

First, according to the present disclosure, the weight and size of a motor may be reduced based on the same output and the output of the motor relative to the same volume may be increased by applying a high-speed driving scheme.

Therefore, when the present disclosure is applied to a motor of a fan of a vacuum cleaner, the maximum speed of the motor may be increased, thereby achieving high-output and miniaturization of the motor for achieving a high-speed operation and improving suction power of the vacuum cleaner.

That is, according to the present disclosure, when the two-phase inverter 140 is used, a voltage utilization rate may also be the same as that of a three-phase inverter for driving a three-phase motor. Thus, the motor assembly according to the present disclosure may be advantageous for low voltage and high current applications such as vacuum cleaners.

Although the two-phase motor of the present disclosure is structurally similar to a general single-phase motor, torque ripple may be arbitrarily controlled. In addition, there may be an advantage in that it is easy to respond to parameter imbalance between windings because a parallel circuit is easily configured. Therefore, a degree of freedom of a motor design may be increased.

BEST MODE

Figure 1:
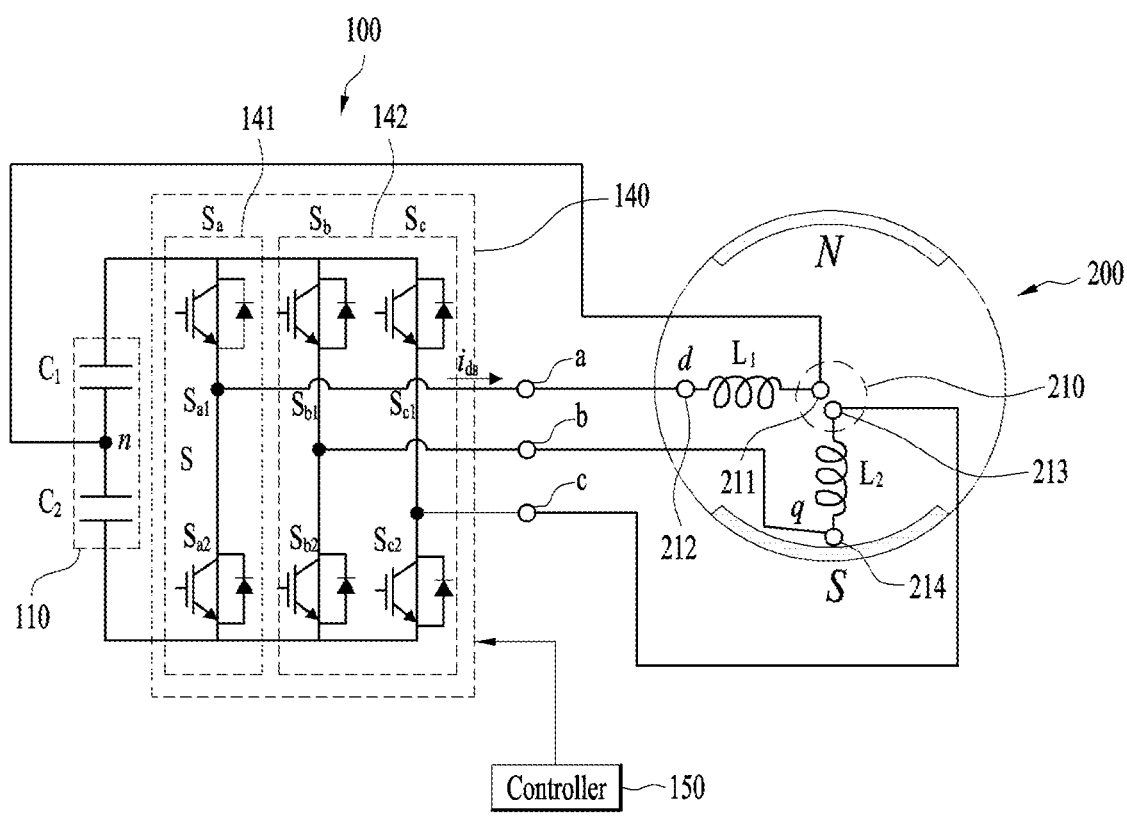
FIG. 1 is a block diagram showing a motor assembly according to an embodiment of the present disclosure.

Hereinafter, the present disclosure will be described in detail by explaining exemplary embodiments of the present disclosure with reference to the attached drawings. The same reference numerals in the drawings denote like elements, and a repeated explanation thereof will not be given. The suffixes "module" and "unit" of elements herein are used for convenience of description and thus can be used interchangeably, and do not have any distinguishable meanings or functions. In the following description of the at least one embodiment, a detailed description of known functions and configurations incorporated herein will be omitted for the purpose of clarity and for brevity. The features of the present disclosure will be more clearly understood from the accompanying drawings and should not be understood to be limited by the accompanying drawings.

Furthermore, although each drawing is described for convenience of explanation, it is also within the scope of the present disclosure for one of skilled in the art to implement another embodiment by combining at least two or more drawings.

When an element such as a layer, a region, or a module is referred to as being "on" another element, this means that it directly exists on the other element or an intermediate element may exist between them.

Figure 2:
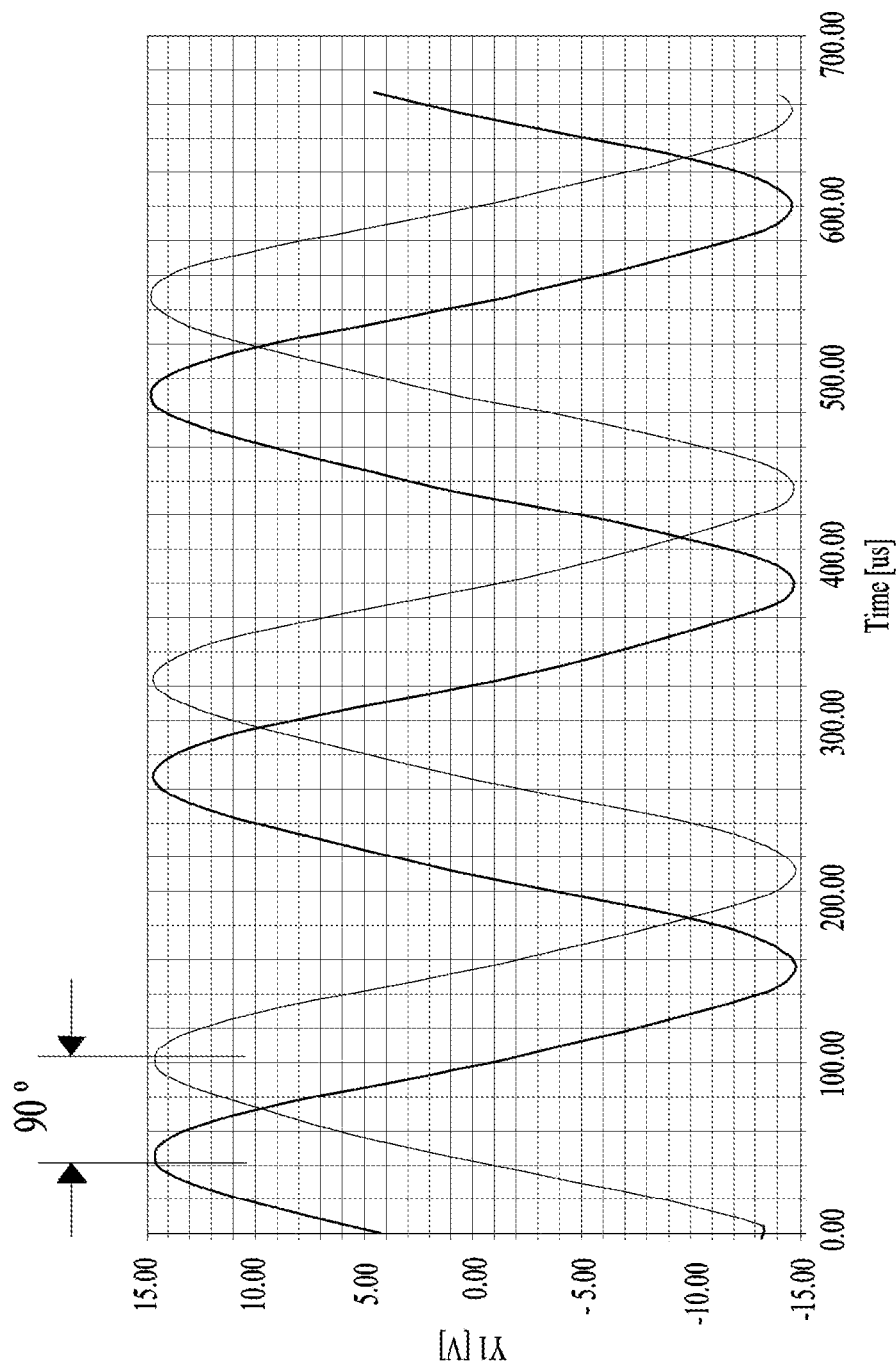
FIG. 2 is a waveform diagram showing an output voltage waveform by a motor assembly according to an embodiment of the present disclosure.

FIG. 1 is a block diagram showing a motor assembly according to an embodiment of the present disclosure. FIG. 2 is a waveform diagram showing an output voltage waveform by a motor assembly according to an embodiment of the present disclosure.

Referring to FIG. 1, the motor assembly may broadly include a two-phase motor 200, and a power converter 100 for driving the motor 200.

The two-phase motor 200 may include a first winding L1 of a first phase connected to a d axis and a second winding L2 connected to a q axis among the d axis and q-axis of a synchronous coordinate system. In the following description, terms such as the d axis, the d phase, and the first phase may be used interchangeably. In addition, terms such as the q axis, the q phase, and the second phase may be used interchangeably.

In this case, the first winding L1 may be connected between a first end 211 and a second end 212, and the second winding L2 may be connected between a third end 213 and a fourth end 214.

The first winding L1 and the second winding L2 may have an electrically insulated parallel structure. That is, in the motor 200, the first winding L1 and the second winding L2 may not be electrically connected to each other. As seen from FIG. 1, the first end 211 and the third end 213 may be electrically separated from each other at a central point 210.

The power converter 100 for driving the two-phase motor 200 may include a DC-link circuit 110 for supplying a DC voltage, and an inverter 140 that is connected to the DC-link circuit 110 and converts the DC voltage to an AC voltage to drive the two-phase motor 200.

The DC-link circuit 110 may include a neutral point n.

In FIG. 1, the DC-link circuit 110 is briefly expressed using a first capacitor C1 and a second capacitor C2 located on both sides of the neutral point n.

For example, the DC-link circuit 110 may be implemented by a battery system.

In another example, the DC-link circuit 110 may include a rectifier (not shown) for rectifying grid power. Therefore, the DC voltage rectified by the rectifier may be accumulated in the first capacitor C1 and the second capacitor C2. The first capacitor C1 and the second capacitor C2 may be referred to as DC-link capacitors.

The inverter 140 may output a two-phase AC current for driving the two-phase motor 200, and the output current may be supplied to the motor 200. Here, for example, the motor 200 may be a motor for driving a vacuum cleaner. Hereinafter, an example in which the motor 200 is a motor for driving a vacuum cleaner, and the power converter 100 is a motor driving device for driving the motor will be described. That is, the power converter 100 may be the same component as the motor driving device.

However, the motor 200 is not limited to such a vacuum cleaner motor, and may be used for an AC motor of various applications using frequency-variable AC voltage, such as air conditioners, refrigerators, washing machines, electric vehicles, and automobiles.

The inverter 140 may include a first switching device set 141 connected to the first winding L1 and a second switching device set 142 connected to the second winding L2.

According to the present embodiment, the first switching device set 141 and the second switching device set 142 may include different numbers of switching devices.

In this case, the first switching device set 141 may include one pair of switching devices Sa: Sa1 and Sa2, and the second switching device set 142 may include two pairs of switching devices Sb: Sb1 and Sb2/Sc: Sc and Sc2.

Sa1 of the first switching device set 141 may be referred to as an upper arm switching device, and Sa2 may be referred to as a lower arm switching device. Similarly, Sb1 and Sc1 of the second switching device set 142 may be referred to as an upper arm switching device, and Sb2 and Sc2 may be referred to as a lower arm switching device.

The switching devices Sa, Sb, and Sc of the inverter 140 may convert DC power output from the DC-link circuit 110 into two-phase AC power of a predetermined frequency and output the same to the motor 200.

In detail, in the inverter 140, the upper arm switching devices Sa1, Sb1, and Sc1 and the lower arm switching devices Sa2, Sb2, and Sc2 each connected in series with each other may form a pair, and a total of three pairs of upper and lower arm switching devices may be connected.

The switching devices Sa, Sb, and Sc of the inverter 140 may use a power transistor, for example, an insulated gate bipolar mode transistor (IGBT).

The power converter 100 may include a controller 150 for controlling the inverter 140.

The controller 150 may apply an inverter control signal to the inverter 140 in order to control a switching operation of the inverter 140. The inverter control signal may be a switching control signal of pulse width modulation (PWM) and may be generated and output based on an output current $i_{ds}/i_{qs}$ flowing in the motor 200 and a DC-link voltage of the DC-link circuit 110. In this case, the output current $i_{ds}/i_{qs}$ may be detected from output current detectors a, b, and c.

The controller 150 may include a gate driver (not shown) for transmitting a PWM signal to a gate terminal of the switching devices Sa, Sb, and Sc included in the inverter 140. Here, the gate driver may be included in the inverter 140. That is, the inverter 140 may use an integrated power module (IPM) including a gate driver.

As described above, the first switching device set 141 and the second switching device set 142 of the inverter 140 may include different numbers of switching devices.

Thus, currents applied from the inverter 140 to the first winding L1 and the second winding L2 of the motor 200 may be asymmetrical. An electrical phase difference between the first winding L1 and the second winding L2 may be 90 degrees or 270 degrees.

In general, in the case of a three-phase motor, a phase difference between two phases may be 120 degrees, and in the case of a single-phase motor, a phase difference between two phases may be 180 degrees, but in the case of a two-phase motor according to an embodiment of the present disclosure, an electrical phase difference between two phases may be 90 degrees or 270 degrees.

As such, a winding of a stator of the two-phase motor 200 may be configured with a 2-parallel structure, and a phase difference between the two windings L1 and L2 may have a range of 90 degrees. In this case, the 2-parallel structure of the stator may be electrically insulated. Accordingly, the two-phase motor 200 may be insulated, and in this case, a neutral point may not exist in the motor 200.

When an electrical connection is formed (motor neutral point), current as much as sqrt (2) (i.e., √2) times the phase current of the second winding L2 may flow into an electric circuit connected to the first winding L1 and the inverter 140, and thus it may be advantageous to design an inverter current rating asymmetrically.

Due to the characteristics of the motor assembly, it may be advantageous to electrically separate a 2-parallel structure of the stator within the motor 200.

In this case, the controller 150 may operate a first phase of the motor 200 with the neutral point n and a half-bridge and operate a second phase of the motor 20 with a full-bridge.

According to the present disclosure, even if the two-phase inverter 140 is used, a voltage utilization rate may be the same as a three-phase inverter for driving a three-phase motor. Thus, the motor assembly according to the present disclosure may be advantageous for low-voltage and high-current application products such as vacuum cleaners.

In addition, although the two-phase motor of the present disclosure is structurally similar to a general single-phase motor, it has an effect of enabling arbitrary control of torque ripple. In addition, there is an advantage in that it is easy to respond to parameter imbalance between windings because a parallel circuit is easily configured. Therefore, a degree of freedom of motor design may be increased.

This effect may be achieved because it is easy to determine a starting direction by ensuring a flow path area equivalent to that of a single-phase motor, minimizing flow path resistance, and ensuring starting reliability.

In addition, an optimized high-speed operation scheme may be applied to a voltage supply system (low voltage/high current) by a battery, which will be described later in detail.

Although not shown, a motor driving device 100 may further include a DC-link voltage detector for detecting a DC-link voltage, an input voltage detector, and an input current detector.

The motor driving device 100 may receive AC power from a system, convert power, and supply the converted power to the motor 200.

Although not shown, the DC-link circuit 110 may include a rectifier for rectifying AC power. The rectifier may receive and rectify AC power and output the rectified power to the inverter 140. To this end, the rectifier may use a full-wave rectifier circuit using a bridge diode.

FIG. 2 shows an output voltage waveform of the motor driving device 100.

As seen from FIG. 2, a voltage of two phases including a first phase and a second phase may be output. These two phases may correspond to the d axis and the q axis of the synchronous coordinate system, respectively.

In FIG. 2, a dark line represents the d-axis output current waveform and a light line represents the q-axis output current waveform. In FIG. 2, a horizontal axis represents time and a vertical axis represents voltage YI.

As described above, it may be seen that electrical phase difference between these two current waveforms is 90 degrees.

FIGS. 3 to 6 are waveform diagrams showing a waveform of current and torque using a control method of a motor assembly according to an embodiment of the present disclosure.

The above-described method of controlling the two-phase motor 200 in which a neutral point is insulated may include a method of distributing torque or torque ripple as a first method, and a method of fixing a condition according to selection/design of a motor parameter as a second method. Hereinafter, a method of distributing torque or torque ripple applied to an embodiment of the present disclosure will be mainly described.

That is, according to the present disclosure, the method of controlling the two-phase motor 200 in which a neutral point is insulated may be a method of distributing torque or torque ripple and controlling the size of d-axis and q-axis current according to the distributed torque or torque ripple.

According to the control method, the size of a phase current flowing into each phase may be controlled.

Figure 3:
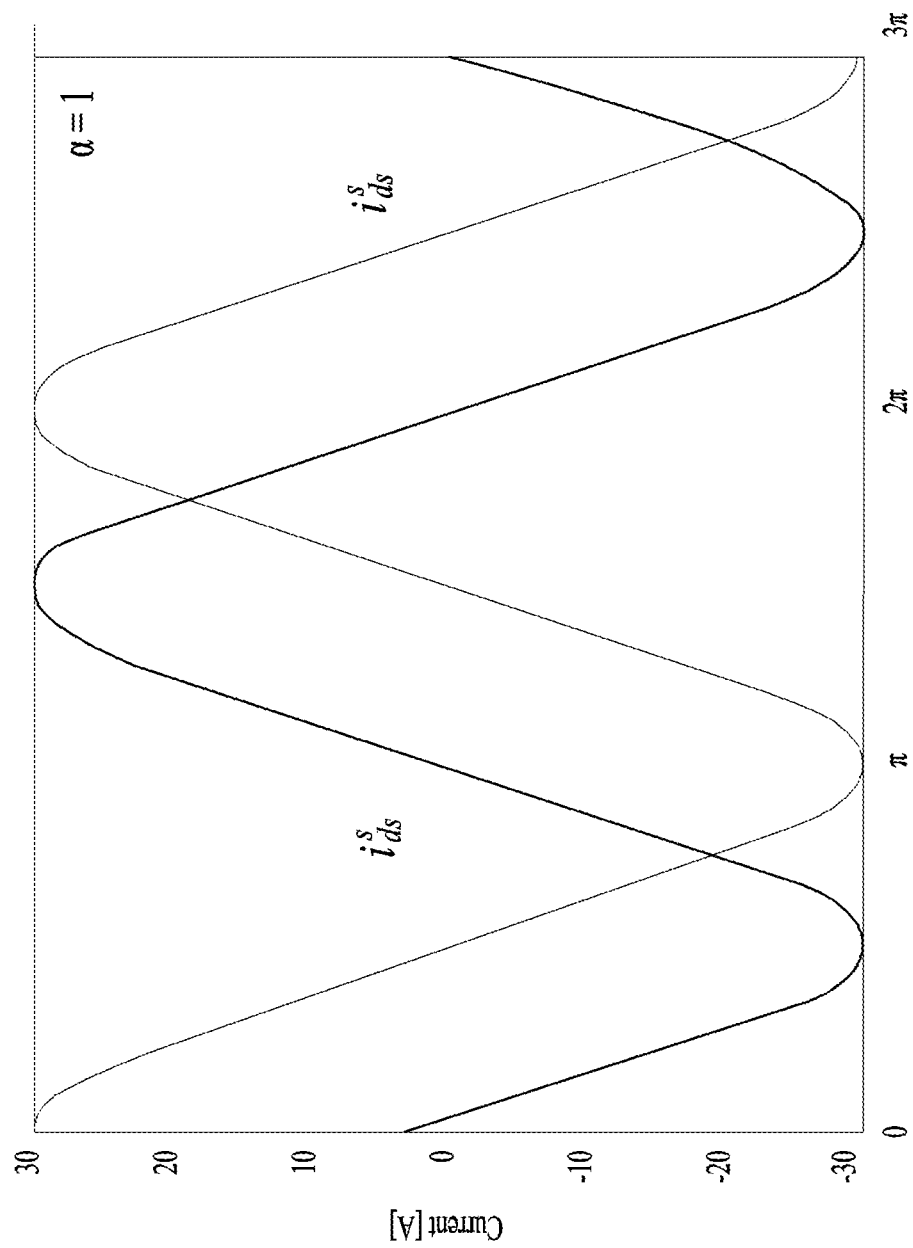
FIGS. 3 to 6 are waveform diagrams showing a waveform of current and torque using a control method of a motor assembly according to an embodiment of the present disclosure.
Figure 4:
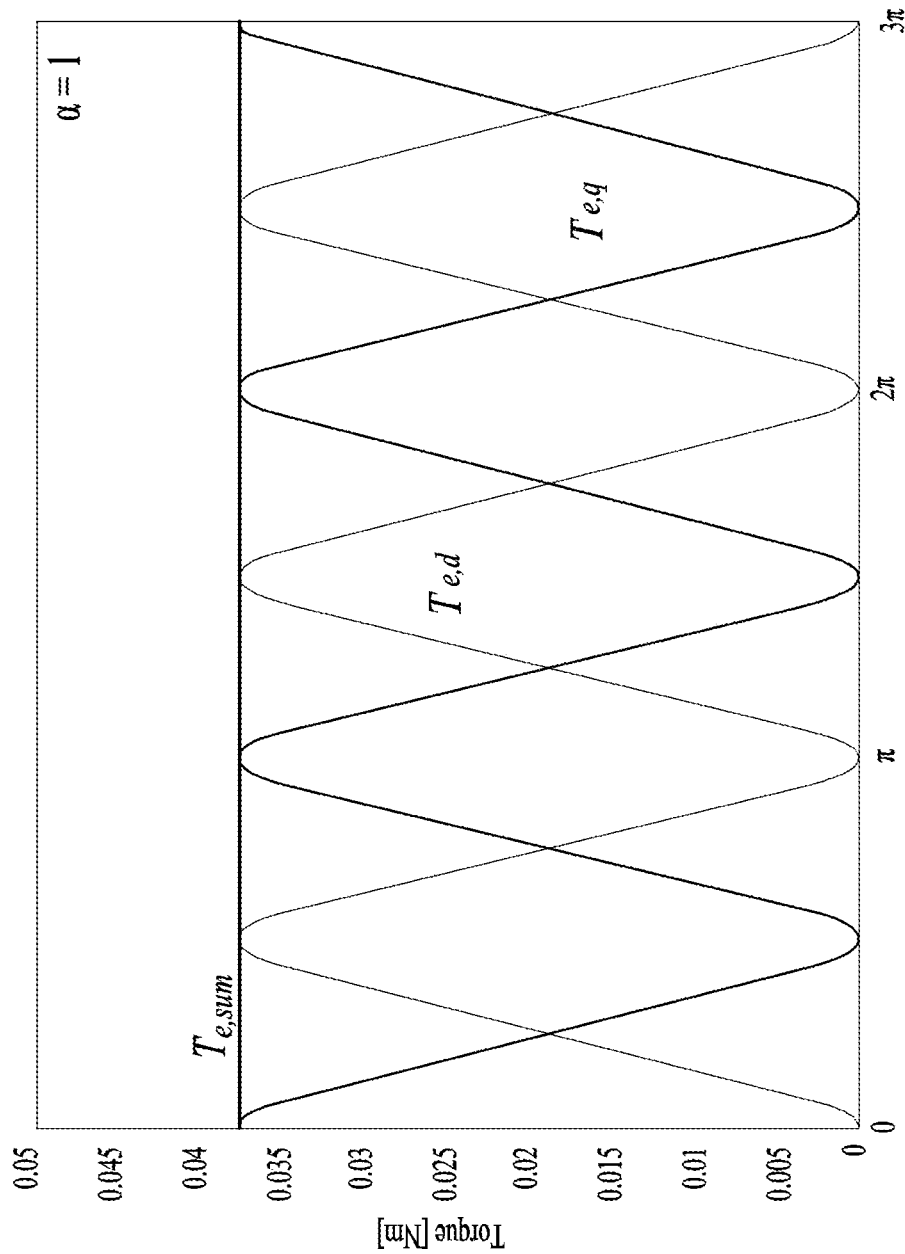
Figure 5:
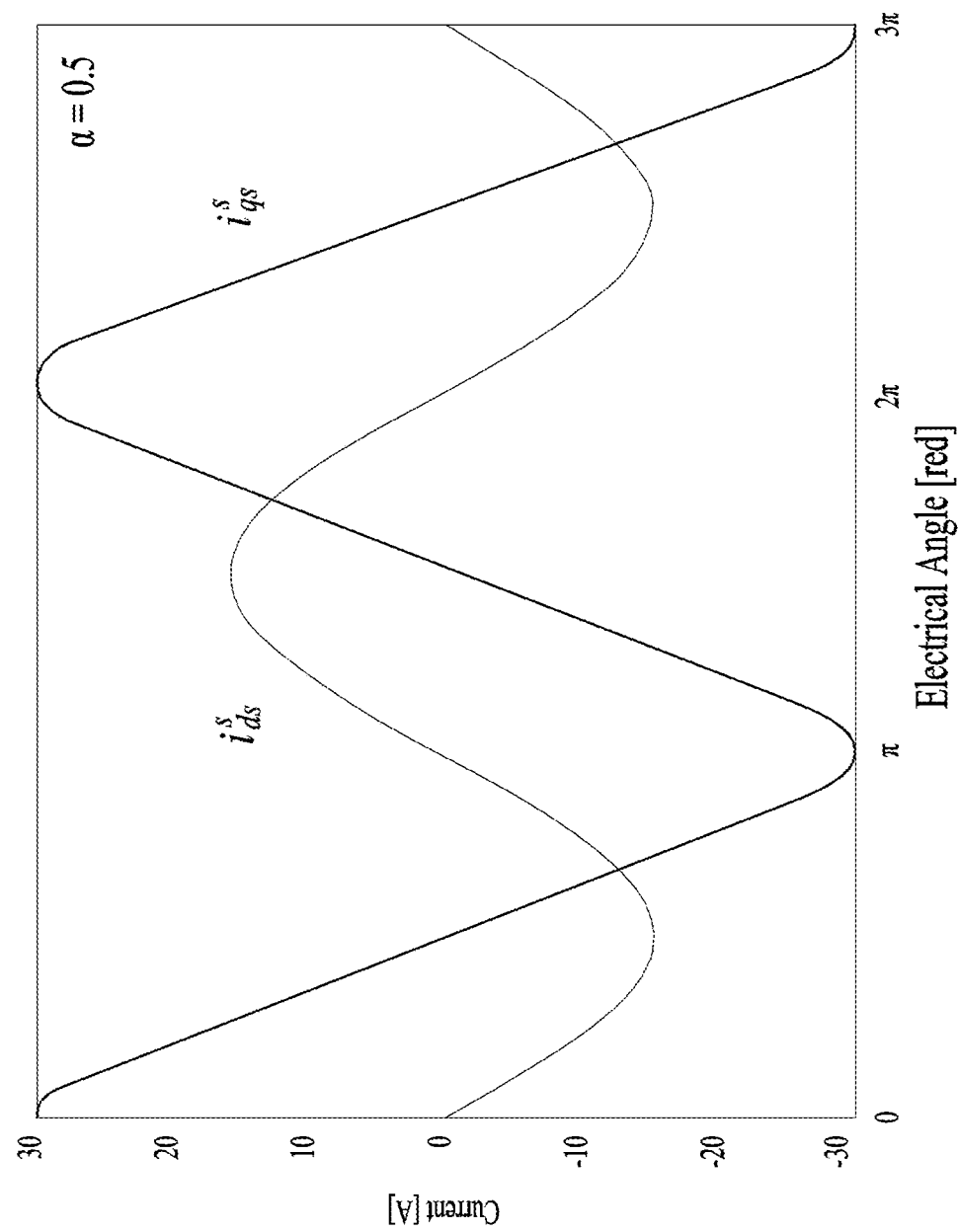
Figure 6:
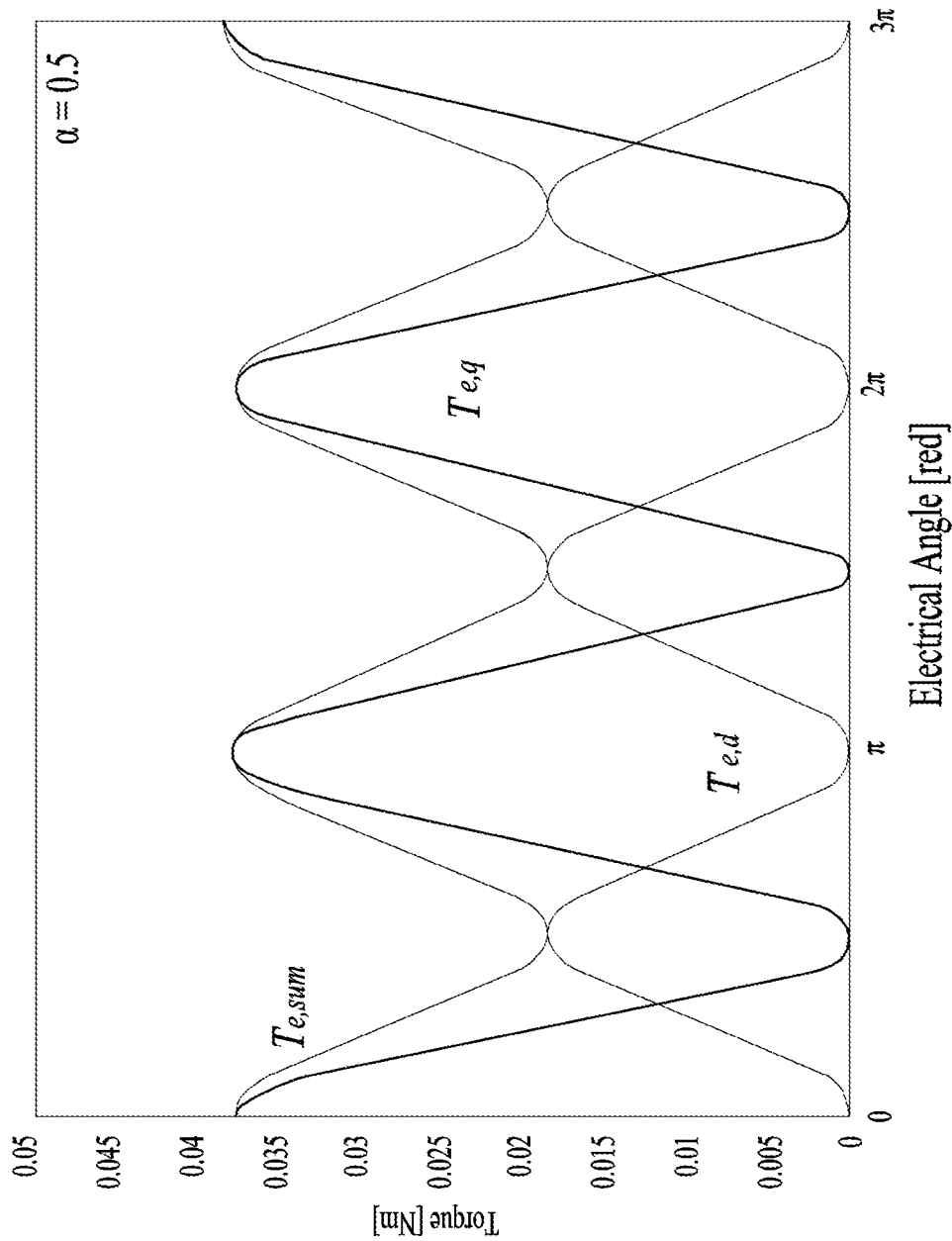

FIG. 3 shows a current waveform when a phase current ratio is 1, and FIG. 4 shows a torque waveform in this case. FIG. 5 shows a current waveform when a phase current ratio is 0.5, and FIG. 6 shows a torque waveform in this case.

In FIG. 3, $i_{ds}^s$ and $i_{qs}^s$ that respectively correspond to d-axis current and q-axis current may be represented using Equation 1 below. In detail, $i_{ds}^s$ is phase current (d-axis current in a stationary coordinate system) flowing in a d-phase motor stator, and $i_{qs}^s$ is phase current (q-axis current in a stationary coordinate system) flowing in a q-phase motor stator.

$$i_{ds}^s = I_{dm} \sin\theta_r$$

$$i_{qs}^s = I_{qm} \cos\theta_r$$ [Equation 1]

Referring to FIG. 4, torque $T^{e,sum}$ in this case may be represented using Equation 2 below.

$$\begin{aligned}T_{e,sum} &= T_{e,d} + T_{e,q} \\ &= \frac{P}{2}(\lambda_d i_{qs,d}^r + \lambda_q i_{qs,q}^r) \\ &= \frac{P}{2}\{\lambda_d i_{ds}^s(-\sin\theta_r) + \lambda_q i_{qs}^s(\cos\theta_r)\} \\ &= \frac{P}{2}\left\{\lambda_d I_{dm}\left(\frac{-1+\cos 2\theta_r}{2}\right) + \lambda_q I_{qm}\left(\frac{1+\cos 2\theta_r}{2}\right)\right\} \\ &= \frac{P}{4}\{(-\lambda_d I_{dm} + \lambda_q I_{qm}) + (\lambda_d I_{dm} + \lambda_q I_{qm})\cos 2\theta_r\}\end{aligned}$$

In Equation 2, the meaning of each symbol is as follows.

$i_{ds}^s$: phase current flowing in d-phase motor stator (d-axis current in stationary coordinate system)

$i_{qs}^s$: phase current flowing in q-phase motor stator (q-axis current in stationary coordinate system)

$I_{dm}$: maximum value of phase current flowing in d-phase motor $I_{qm}$: maximum value of phase current flowing in q-phase motor $i_{qs,d}^r$: q-axis current of rotating coordinate system of d-phase motor $i_{qs,q}^r$: q-axis current of rotating coordinate system of q-phase motor $T_{e,sum}$: motor output torque/sum of output torque of d-phase and q-phase motor $T_{e,d}$: separate output torque of d-phase motor $T_{e,q}$: separate output torque of q-phase motor P: number of rotor poles $\lambda_d$: counter electromotive force voltage of d-phase motor [V/rad/s]

$\lambda_q$: counter electromotive force voltage of q-phase motor [V/rad/s]

$\theta_r$: electrical angle/position of rotor

Figure 7:
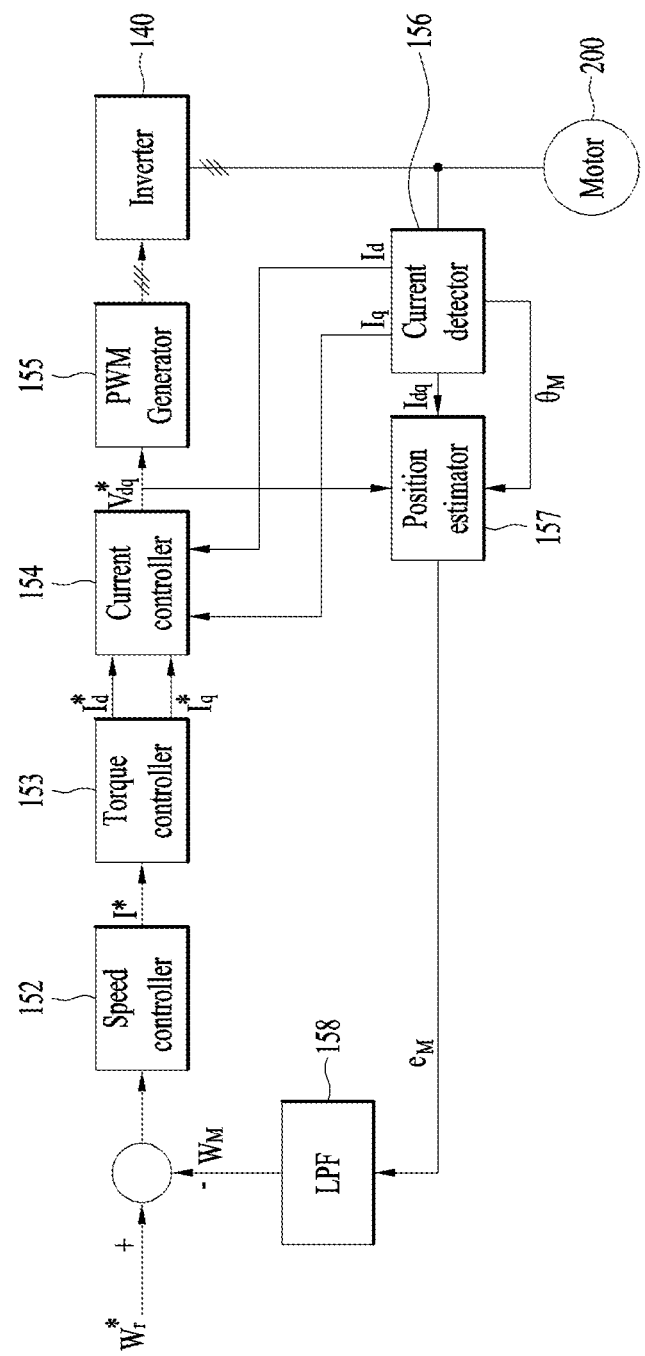
FIG. 7 is a block diagram showing details of a controller of a motor assembly according to an embodiment of the present disclosure.

FIG. 7 is a block diagram showing details of a controller of a motor assembly according to an embodiment of the present disclosure.

Referring to FIG. 7, the detailed configuration of the controller 150 described above is shown, and the inverter 140 and the motor 200 are also shown.

For example, the controller 150 may mainly use a motor control method of a proportional integral control method.

That is, the controller 150 of the proportional integral control method may include a speed controller 152, a current controller 154, a driving signal (PWM) generator 155, a current detector 156, and a position estimator 157.

Here, the current detector 156 may be the same as the above-described current detector.

The speed and position of the motor 200 may be implemented using a sensor-less method through the current detector 156. That is, the position estimator 157 may estimate a rotor position $\theta_M$ of a motor using current detected through the current detector 156, and detect the speed and position of the motor 200 using the estimated rotor position. The rotor position $\theta_M$ of the motor, estimated by the position estimator 157, may be fed back through a low pass filter 158.

That is, when the speed and position of the motor 200 is detected using a sensor-less method that does not use a sensor, the speed and the position may be estimated using current detected using the current detector 156.

The speed controller 152 may generate a target current based on a target speed (speed command value: $W_r^*$) and a speed $W_M$ of the motor 200 detected through the current detector 156. The current detected by the current detector 156 may be fed back to the current controller 154.

A torque controller 153 may be provided between the speed controller 152 and the current controller 154, and a current command value I* may be divided into a d-axis current command value $I_d$* and a q-axis current command value $I_q$*.

The current controller 154 may generate a target voltage $V_{dq}$* (voltage command value) based on the target current I* (current command value) output from the speed controller 152.

The PWM generator 155 may generate a driving signal (PWM signal) based on the target voltage $V_{dq}$* generated by the current controller 154 and the position of the motor 200 detected by the current detector 156.

According to the driving signal (PWM signal), the inverter 140 may generate a driving voltage, and the motor 200 may be driven according to the driving voltage.

In some cases, a frequency variable part (not shown) may be positioned at a front end of the speed controller 152 to vary a switching frequency according to efficiency for each speed of the inverter.

As such, the controller 150 may include the speed controller 152 for generating target current based on the target speed and the speed of the motor 200 detected through the current detector 156, and the current controller 154 for generating the target voltage based on the target current in such a way that the target voltage is less than an output voltage of the rectifier 110.

As described above, the speed controller 152 of the controller 150 may detect a speed control condition of the motor 200 and generate a speed command accordingly.

As described above, the torque controller 153 may generate a torque command by changing a distribution ratio of torque.

The current controller 154 may separately perform weak field control on each phase according to the speed of the motor 200.

Figure 8:
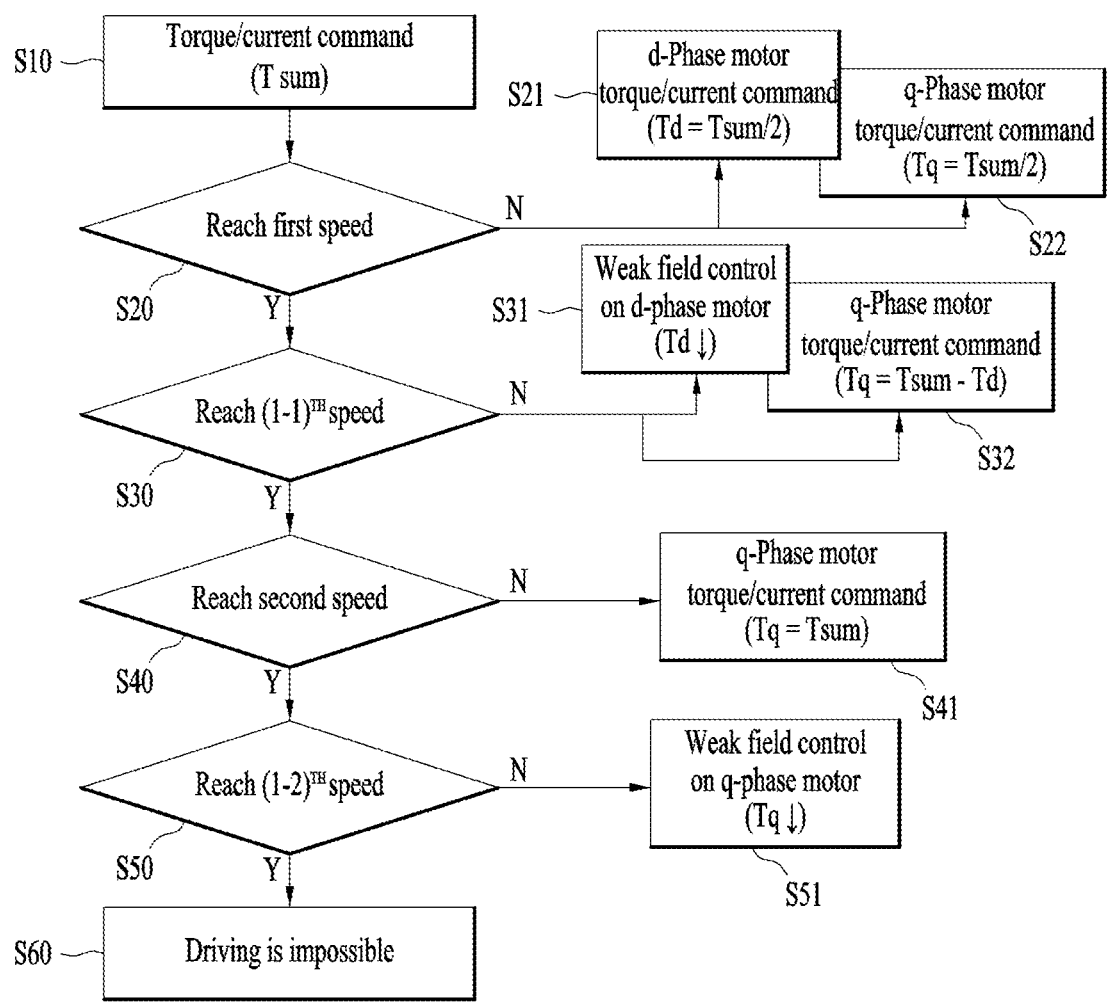
FIG. 8 is a flowchart showing a control method of a motor assembly according to an embodiment of the present disclosure.
Figure 9:
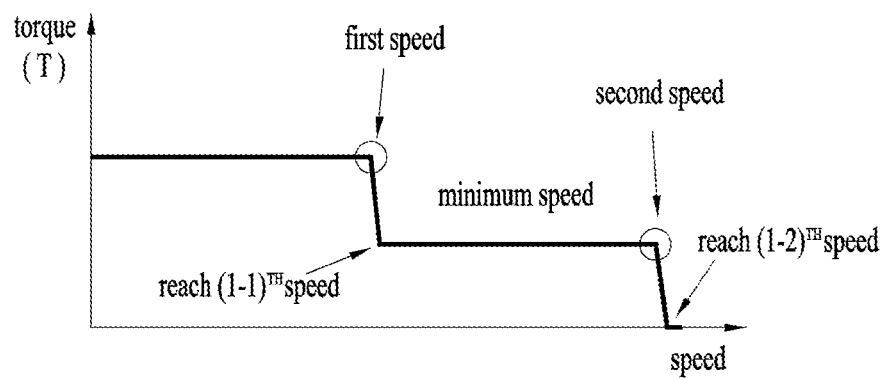
FIG. 9 is a graph showing a speed according to the control method of FIG. 8.

FIG. 8 is a flowchart showing a control method of a motor assembly according to an embodiment of the present disclosure. FIG. 9 is a graph showing a speed according to the control method of FIG. 8.

FIG. 8 shows a detailed current command according to a speed based on the torque command described in Equation 2.

As described above, the first phase (d-phase) motor 200 may be controlled by a half-bridge, and the second phase (q-phase) motor 200 may be controlled by a full-bridge. Thus, the q-phase motor may apply twice a voltage compared to the d-phase motor. Therefore, it may be assumed that the q-phase motor is designed to have a counter electromotive force twice that of the d-phase motor in order to maximize a voltage utilization rate.

Referring to FIGS. 8 and 9, each speed and a current command at each speed will be described.

1. First Speed

The first speed may mean a speed condition in which a counter electromotive force voltage of the d-phase motor generated at this speed and a fundamental wave voltage that to be supplied from the half-bridge are the same.

A synthetic torque obtained by adding the torque output of the d-phase motor and output of the q-phase motor may be output. Therefore, for example, when the motor assembly is applied to a vacuum cleaner, in an actual use condition, the maximum speed condition corresponding to an increased load torque condition such as clogging of a suction port of a vacuum cleaner or an increase in the amount of dust in a dust bin (dust filling amount) may be defined.

2. $(1-1)^{th}$ Speed

The d-phase motor may perform weak field control to reduce the counter electromotive force voltage above the first speed. It may be difficult to find a recognizable meaning in terms of product function, and it may be defined as a transition area to enter a second speed area rather than a normal operation area.

Here, weak field control may mean controlling a phase of the phase current of the motor stator to lead the phase of the counter electromotive force voltage.

3. Second Speed

It may be defined as the maximum operating speed for operating a vacuum cleaner fan motor. For example, the maximum speed indicated in the specification of a vacuum cleaner product may correspond to the second speed.

4. $(2-1)^{th}$ Speed

In terms of a product function, it may be difficult to define as a normal operation area, and it may be defined as an academic/theoretical maximum operation area in terms of a motor design.

Referring to FIG. 8, a torque/current command Tsum may be executed (S10).

In this case, in a region with the first speed or less of the motor 200, the torque controller 153 of the controller 150 may apply a torque command half of the torque requested by a load of the motor 200 to each of the first phase (d-phase) and the second phase (q-phase), respectively.

That is, until the first speed is reached (S20), a torque corresponding to half of the total torque Tsum/2 may be applied as the torque/current command Td of the d-phase motor (S21).

Similarly, a torque corresponding to half of the total torque Tsum/2 may be applied as the torque/current command Tq of the q-phase motor (S22).

Then, in a region with the first speed or greater and the second speed or less, different torque commands may be applied in the first phase and the second phase.

For example, up to a $(1-1)^{th}$ speed greater than the first speed and lower than the second speed (S30), the torque controller 153 may perform weak field control on the first phase (S31) and apply a torque command (Tq=Tsum−Td) obtained by subtracting a first phase output torque from a torque requested by a load to the second phase (S32).

Up to a second speed greater than the $(1-1)^{th}$ speed (S40), the torque controller 153 may turn off the first phase and apply a torque command (Tq=Tsum) corresponding to a torque of a load to the second phase (S41).

Up to a $(2-1)^{th}$ speed greater than the second speed (S50), the torque controller 153 may turn off the first phase and perform weak field control on the second phase (S51).

As described above, the $(2-1)^{th}$ speed may be defined as a theoretical maximum driving range, and thus driving may not be possible after the $(2-1)^{th}$ speed (S60).

In this case, as described above, the first speed may be the maximum torque of the first phase motor or the maximum speed for reaching a current value corresponding to the maximum torque.

The second speed may be the maximum torque of the second phase motor or the maximum speed for reaching a current value corresponding to the maximum torque.

Figure 10:
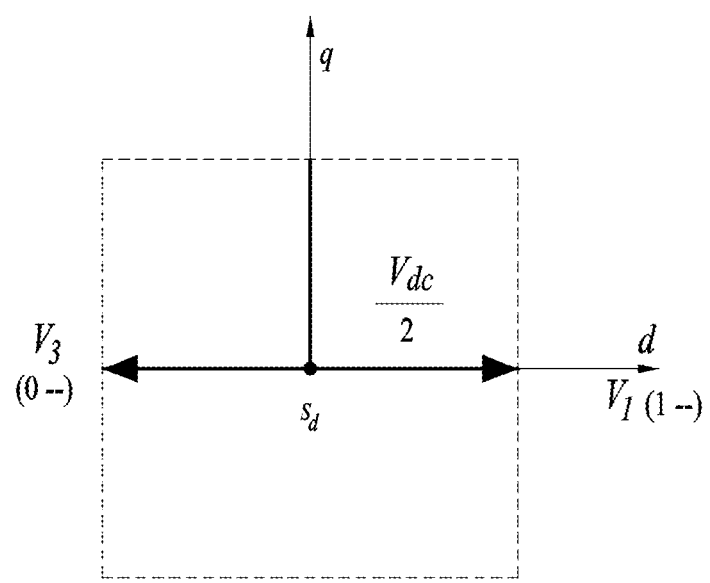
FIGS. 10 to 12 are schematic diagrams showing a control method of a d-phase motor of a motor assembly according to an embodiment of the present disclosure.
Figure 11:
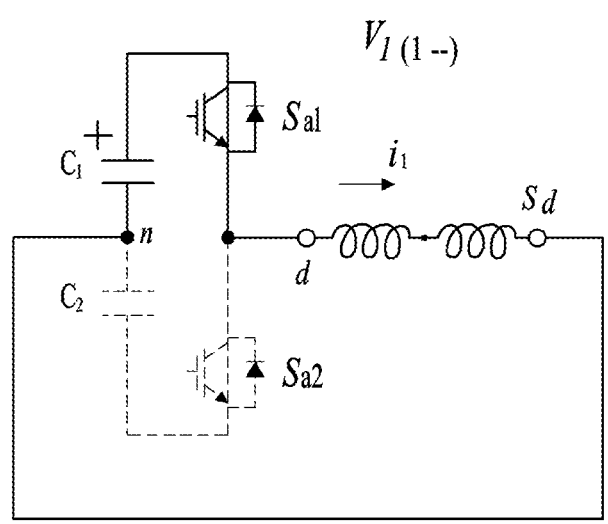
Figure 12:
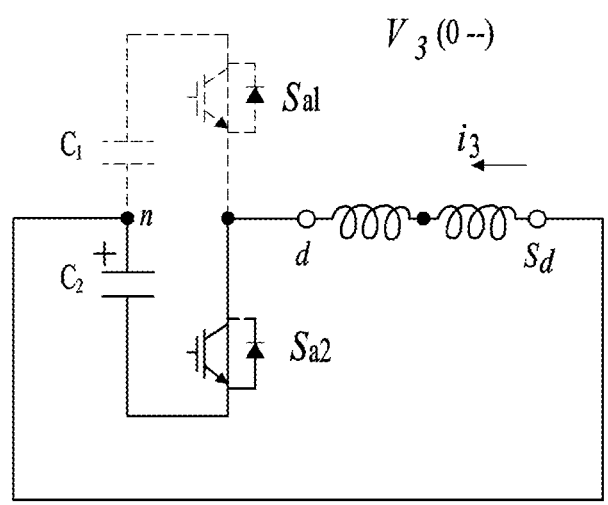

FIGS. 10 to 12 are schematic diagrams showing a control method of a d-phase motor of a motor assembly according to an embodiment of the present disclosure.

Referring to FIGS. 10 to 12, as shown in the following diagram, an operation of a motor may be controlled using two voltage vectors V1 and V3 using operations of two switches. The voltage vectors V1 and V3 may be directed in opposite directions, and may be generated by the first switching device set 141 in FIG. 1. That is, the voltage vectors V1 and V3 may be generated by one pair of switching devices Sa: Sa1 and Sa2 included in the first switching device set 141.

Here, it may be seen that the maximum synthesizable voltage is half (Vdc/2) of the DC-link voltage (Vdc; output voltage of the DC-link circuit). In addition, it may be seen that the voltage vectors V1 and V3 are generated along the d axis and have opposite directions.

FIGS. 11 and 12 show a current flow according to the state of a switch.

First, referring to FIG. 11, when the upper arm switching device Sa1 of the first switching device set 141 operates, a voltage vector in a direction V1 may be generated. Thus, a first current $i_1$ may flow in a d-axis direction.

When the lower arm switching device Sa2 of the first switching device set 141 operates, a voltage vector in a direction V3 may be generated. Thus, a third current $i_3$ may flow in an opposite direction to the d-axis direction.

When times when voltage vectors are applied have a slight difference, there may be a possibility of voltage imbalance between an upper arm capacitor C1 and a lower arm capacitor C2.

However, a problem caused by this possibility may be alleviated to some extent by a switching state for controlling a q-phase motor described below.

Figure 13:
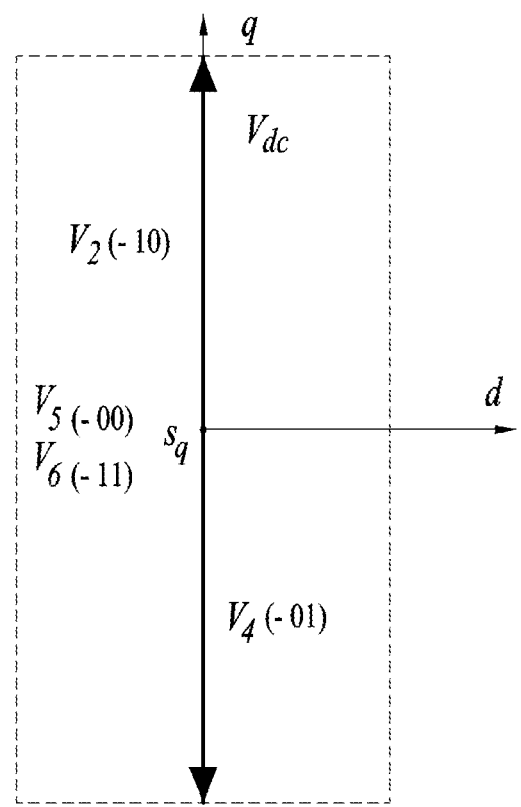
FIGS. 13 to 15 are schematic diagrams showing a control method of a q-phase motor of a motor assembly according to an embodiment of the present disclosure.
Figure 14:
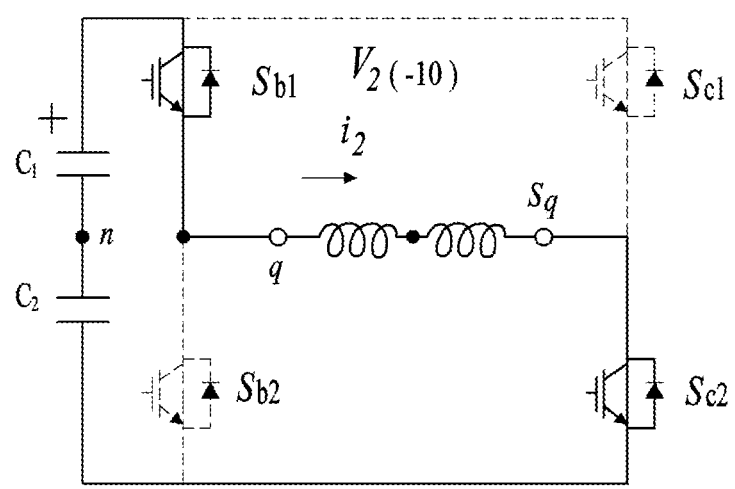
Figure 15:
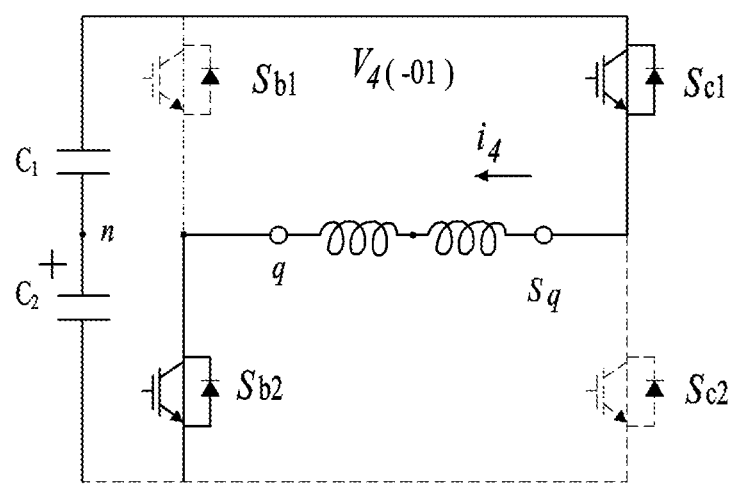

FIGS. 13 to 15 are schematic diagrams showing a control method of a q-phase motor of a motor assembly according to an embodiment of the present disclosure.

Referring to FIGS. 13 to 15, as shown in the following diagram, an operation of a motor may be controlled using two voltage vectors V2 and V4 using operations of two switches.

The voltage voltages V2 and V4 may be directed in opposite directions, and may be generated by the second switching device set 142 in FIG. 1. That is, the voltage vectors V2 and V4 may be generated by two pairs of switching devices Sb (Sb1 and Sb2) and Sc (Sc1 and Sc2) included in the second switching device set 142.

Here, it may be seen that the maximum synthesizable voltage is output as a DC-link voltage Vdc. That is, here, it may be seen that a voltage Vdc is output as the maximum synthesizable voltage.

It may be seen that voltage vectors V2 and V4 are generated along the q axis and have opposite directions.

FIGS. 14 and 15 show a current flow according to the state of a switch.

First, referring to FIG. 14, when the upper arm switching device Sb1 at one side of the second switching device set 142 and the lower arm switching device Sc2 at the other side operate, a voltage vector in a direction V2 may be generated. Thus, a second current $i_2$ may flow in the q-axis direction.

When the lower arm switching device Sb2 at one side of the second switching device set 142 and the upper arm switching device Sc1 at the other side operate, a voltage vector in a direction V4 may be generated. Thus, a fourth current $i_4$ may flow in an opposite direction to the q-axis.

Figure 16:
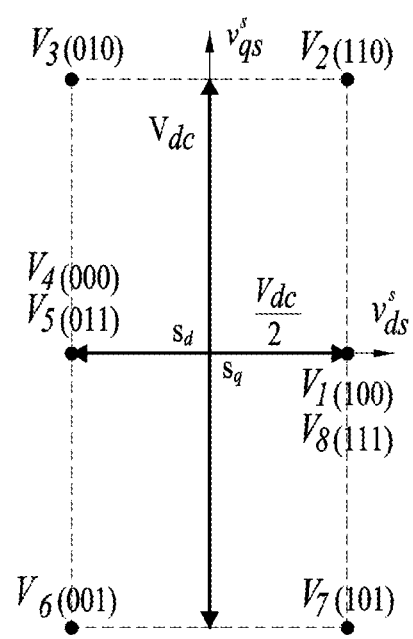
FIG. 16 is a vector diagram showing an effective voltage vector of a motor assembly according to an embodiment of the present disclosure.

FIG. 16 is a vector diagram showing an effective voltage vector of a motor assembly according to an embodiment of the present disclosure.

If four independent voltage vectors V1 to V4 described above are plotted on the same voltage plane, as shown in FIG. 16, eight effective voltage vectors including V1 to V8 may be generated.

Figure 17:
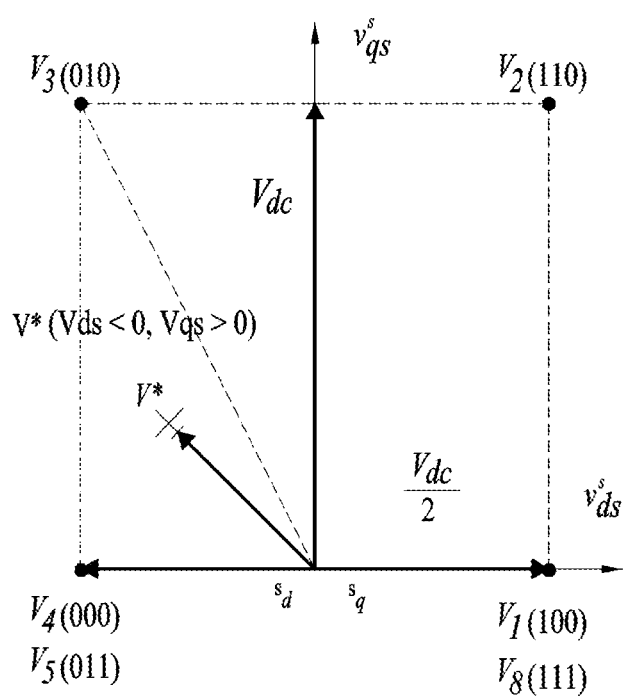
FIG. 17 is diagrams showing a PWM signal synthesized by an effective voltage vector of a motor assembly according to an embodiment of the present disclosure.

FIG. 17 is diagrams showing a PWM signal synthesized by an effective voltage vector of a motor assembly according to an embodiment of the present disclosure.

Referring to FIG. 17, a voltage may be output in order of V8→V→V3→V4→V3→V5→V8 as a combination of effective voltage vectors shown in FIG. 16 according to a voltage command V*.

In this case, the size of the voltage command V* may refer to the length of each vector, and thus it may be seen that a time of applying an effective voltage vector increases proportionally.

Figure 18:
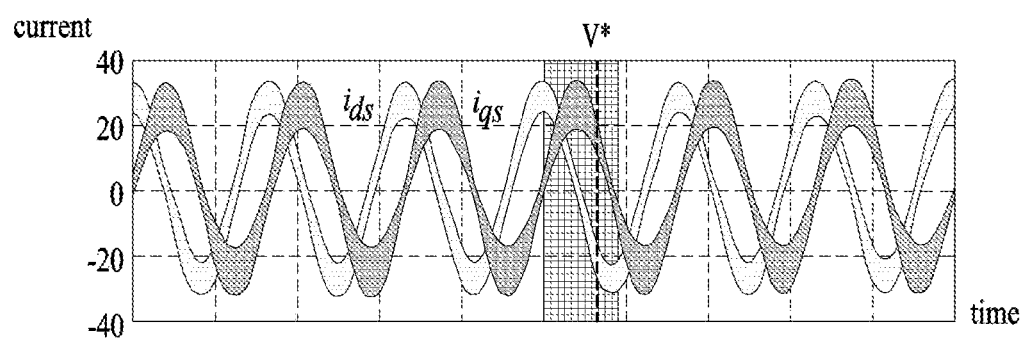
FIG. 18 is a signal diagram showing a current of a motor assembly according to an embodiment of the present disclosure.
Figure 19:
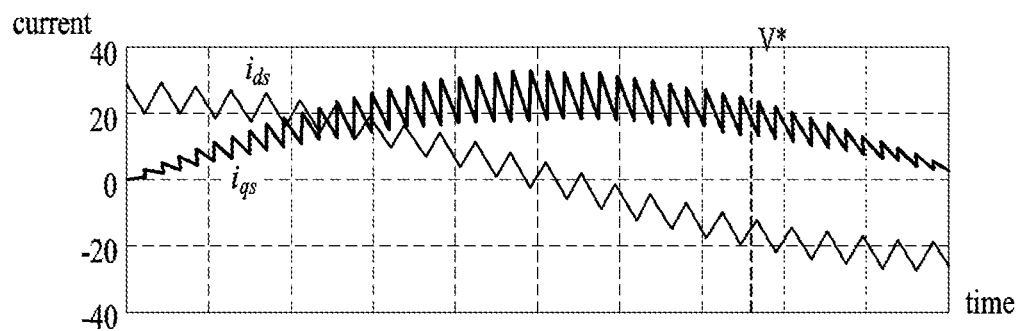
FIG. 19 is a partial enlarged view of FIG. 18.

FIG. 18 is a signal diagram showing a current of a motor assembly according to an embodiment of the present disclosure. FIG. 19 is a partial enlarged view of FIG. 18.

FIG. 18 shows a current ids flowing in a d-phase winding (first winding; L1) of the motor 200 and a current iqs flowing in a q-phase winding (second winding; L2) of the motor 200.

As described above, the above two phase currents may have a phase difference of 90 degrees electrically. This may be a key feature of a two-phase motor.

FIG. 19 is an enlarged view of a band portion (a time corresponding to an electrical angle of 180 degrees) in FIG. 18.

Figure 20:
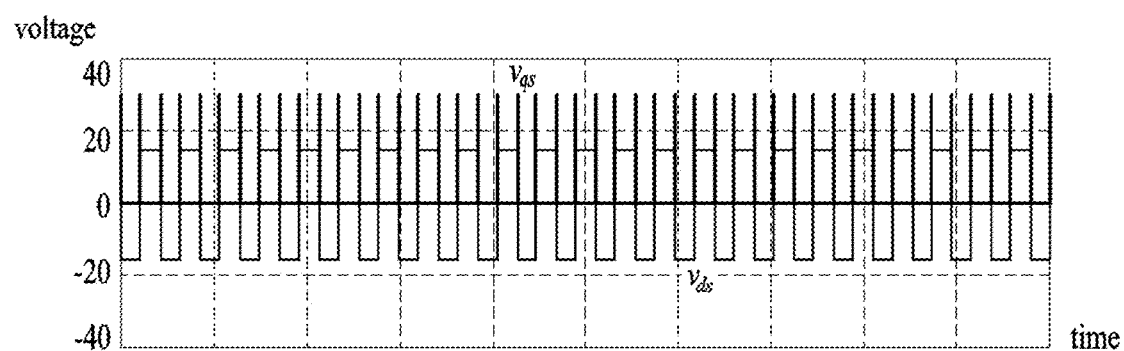
FIG. 20 is a signal diagram showing a voltage of a motor assembly according to an embodiment of the present disclosure.
Figure 21:
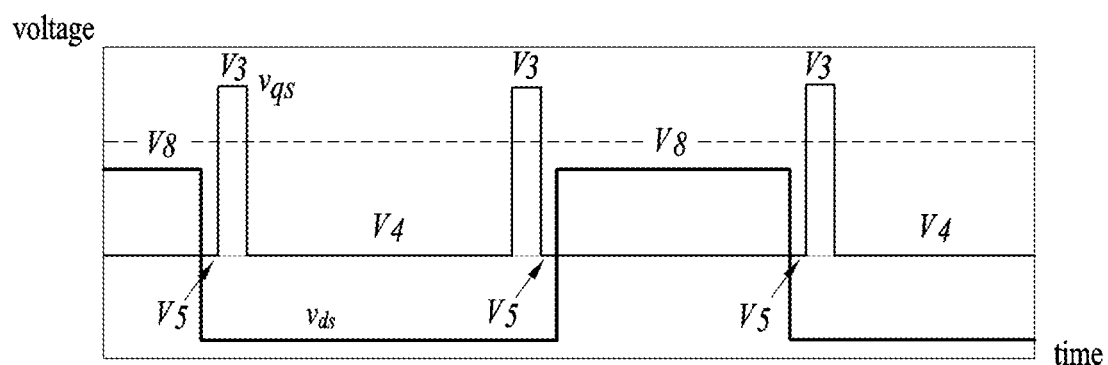
FIG. 21 is a partial enlarged view of FIG. 20.

FIG. 20 is a signal diagram showing a voltage of a motor assembly according to an embodiment of the present disclosure. FIG. 21 is a partial enlarged view of FIG. 20.

FIG. 20 shows a voltage vds applied to a d-phase winding (first winding; L1) and a voltage vqs applied to a q-phase winding (second winding; L2).

The voltage command V* for synthesizing a sinusoidal current at a specific point in time in FIG. 18 may be spatially mapped based on 1 cycle of electrical angle/360 degrees, like the effective voltage vector in FIG. 16.

FIG. 21 shows a diagram in which a voltage command is decomposed into an effective voltage vector.

Figure 22:
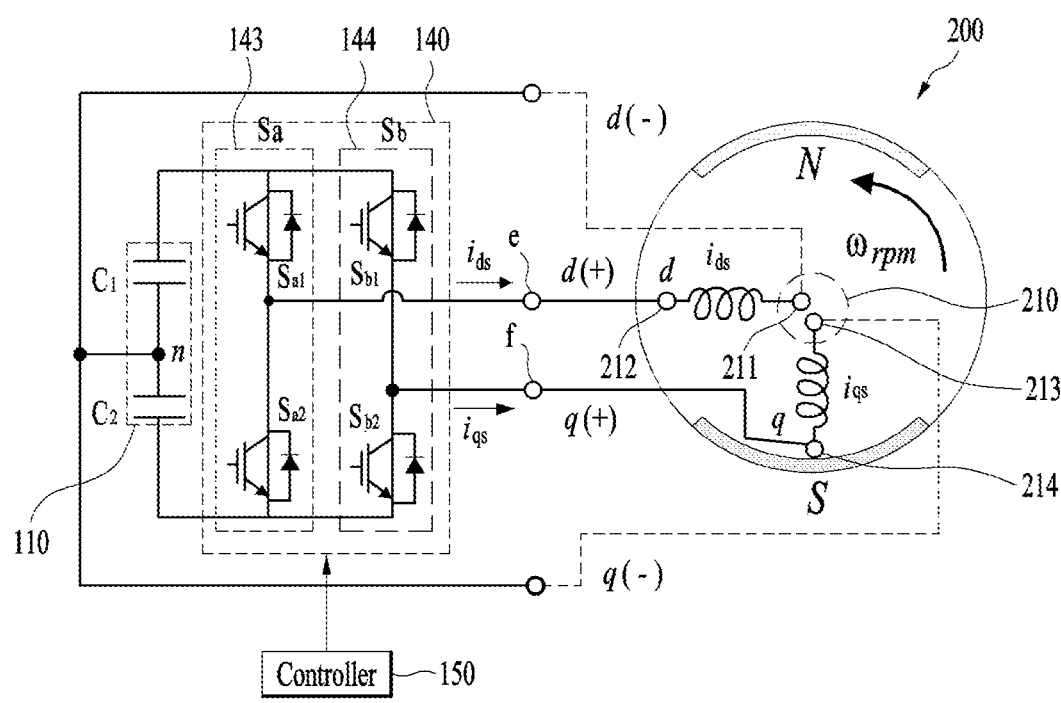
FIG. 22 is a circuit diagram of a motor assembly according to another embodiment of the present disclosure.
Figure 23:
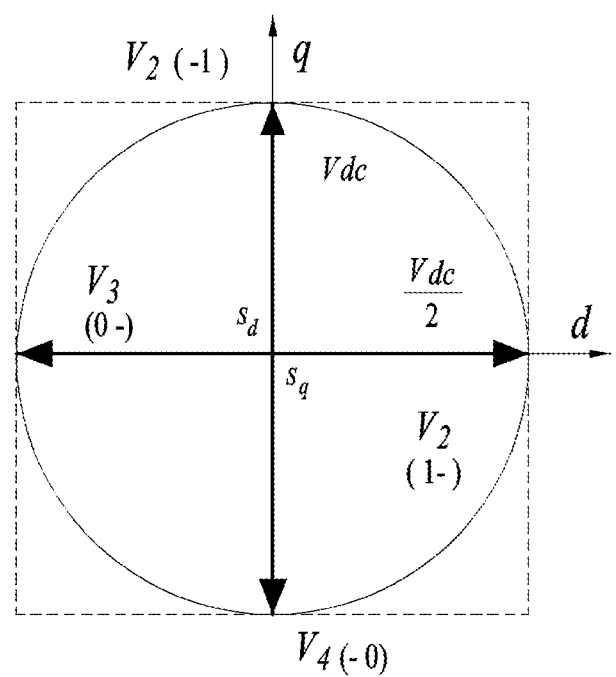
FIG. 23 is a vector diagram showing an effective voltage vector of a motor assembly according to another embodiment of the present disclosure.

FIG. 22 is a circuit diagram of a motor assembly according to another embodiment of the present disclosure. FIG. 23 is a vector diagram showing an effective voltage vector of a motor assembly according to another embodiment of the present disclosure.

Hereinafter, another embodiment of the present disclosure will be described with reference to FIGS. 22 and 23. In the following description, if it is common to the description described with reference to FIG. 1, the description may be omitted.

Referring to FIG. 22, the motor assembly may broadly include the two-phase motor 200 and the power converter 100 for driving the motor 200.

The two-phase motor 200 may include the first winding L1 of a first phase connected to the d-axis and the second winding L2 connected to the q axis among the d-axis and q-axis of the synchronous coordinate system.

In this case, the first winding L1 may be connected between the first end 211 and the second end 212, and the second winding L2 may be connected between the third end 213 and the fourth end 214.

The first winding L1 and the second winding L2 may have an electrically insulated parallel structure. That is, in the motor 200, the first winding L1 and the second winding L2 may not be electrically connected. As seen from FIG. 1, in the central point 210, the first end 211 and the third end 213 may be electrically separated from each other.

The power converter 100 for driving the two-phase motor 200 may include a DC-link circuit 110 for supplying a DC voltage, and the inverter 140 that is connected to the DC-link circuit 110 and converts a DC voltage to an AC voltage to drive the two-phase motor 200.

The DC-link circuit 110 may include the neutral point n.

In FIG. 1, the DC-link circuit 110 is briefly shown using the first capacitor C1 and the second capacitor C2 positioned at both sides of the neutral point n.

For example, the DC-link circuit 110 may be implemented by a battery system. The first capacitor C1 and the second capacitor C2 of the DC-link circuit 110 may be referred to as a DC-link capacitor.

The inverter 140 may output two-phase AC current for driving the two-phase motor 200, and the output current may be supplied to the motor 200. Here, for example, the motor 200 may be a motor for driving a vacuum cleaner.

The inverter 140 may include a first switching device set 143 connected to the first winding L1 and a second switching device set 144 connected to the second winding L2.

According to the present embodiment, the first switching device set 143 and the second switching device set 144 may include the same number of switching devices.

In this case, the first switching device set 143 may include one pair of switching devices Sa: Sa1 and Sa2, and the second switching device set 144 may include one pair of switching devices Sb: Sb1 and Sb2.

Sa1 of the first switching device set 143 may be referred to as an upper arm switching device, and Sa2 may be referred to as a lower arm switching device. Similarly, Sb1 of the second switching device set 144 may be referred to as an upper arm switching device, and Sb2 may be referred to as a lower arm switching device.

The switching devices Sa and Sb of the inverter 140 may convert DC power output from the DC-link circuit 110 into two-phase AC power at a predetermined frequency and output the two-phase AC power to the motor 200.

In detail, in the inverter 140, the upper arm switching devices Sa1 and Sb1 and the lower arm switching devices Sa2 and Sb2 each connected in series with each other may form a pair, and a total of two pairs of upper and lower arm switching devices may be connected.

The power converter 100 may include the controller 150 for controlling the inverter 140.

The controller 150 may apply an inverter control signal to the inverter 140 in order to control a switching operation of the inverter 140. The inverter control signal may be a switching control signal of a pulse width modulation method (PWM) and may be generated and output based on an output current $i_{ds}/i_{qs}$ flowing in the motor 200 and a DC-link voltage of the DC-link circuit 110. In this case, the output current $i_{ds}/i_{qs}$ may be detected from output current detectors e and f.

The controller 150 may include a gate driver (not shown) for transferring a PWM signal to a gate terminal of the switching devices Sa and Sb included in the inverter 140. Here, the gate driver may be included in the inverter 140. That is, the inverter 140 may use an integrated power module (IPM) including the gate driver.

As described above, the first switching device set 141 and the second switching device set 142 of the inverter 140 may include the same number of switching devices.

Thus, currents applied from the inverter 140 to the first winding L1 and the second winding L2 of the motor 200 may be symmetrical. In addition, an electrical phase difference between the first winding L1 and the second winding L2 may be 90 degrees or 270 degrees.

As such, a winding of a stator of the two-phase motor 200 may have a 2-parallel structure, and a phase difference between the two windings L1 and L2 may have a range of 90 degrees. In this case, the 2-parallel structure of the stator may be electrically insulated. Accordingly, the two-phase motor 200 may be insulated, and in this case, a neutral point may not exist in the motor 200.

In this case, the controller 150 may operate two phases of the motor 200 using a neutral point and two half-bridges. According to the present embodiment, a voltage utilization rate may be reduced compared with the above-described embodiment.

In detail, in the case of a q-phase, a voltage utilization rate may be reduced by half from $4/\eta^* Vdc$ to $2/\eta^* Vdc$ compared to the above embodiment.

However, in the case of a d-phase, a voltage utilization rate may be $2/\eta^* Vdc$, which is the same as the above embodiment.

In the embodiment described above, since the q-phase motor may apply twice as much voltage as the d-phase motor, the q-phase motor may be designed to have twice as much counter electromotive force as the d-phase motor.

However, according to the present embodiment, the d-phase motor and the q-phase motor may be designed to have the same counter electromotive force.

As seen from FIG. 23, the size of voltage vectors V1 and V3 may be the same as the size of voltage vectors V2 and V4.

According to the present embodiment, the above described second speed and $(2-1)^{th}$ speed may not be defined.

The description related to a region before the second speed, that is, the first speed and the $(1-1)^{th}$ speed, is the same as in the case of the above-described embodiment.

According to the present disclosure, when the two-phase inverter 140 is used, a voltage utilization rate may also be the same as a three-phase inverter for driving a three-phase motor. Thus, the motor assembly according to the present disclosure may be advantageous for low voltage and high current applications such as vacuum cleaners.

According to the present disclosure as described above, the weight and size of a motor may be reduced based on the same output and the output of the motor relative to the same volume may be increased by applying a high-speed driving scheme.

Therefore, when the present disclosure is applied to a motor of a fan of a vacuum cleaner, the maximum speed of the motor may be increased, thereby achieving high-output and miniaturization of the motor for achieving a high-speed operation and improving suction power of the vacuum cleaner.

That is, according to the present disclosure, when the two-phase inverter 140 is used, a voltage utilization rate may also be the same as a three-phase inverter for driving a three-phase motor. Thus, the motor assembly according to the present disclosure may be advantageous for low voltage and high current applications such as vacuum cleaners.

Although the two-phase motor of the present disclosure is structurally similar to a general single-phase motor, torque ripple may be arbitrarily controlled. In addition, there may be an advantage in that it is easy to respond to parameter imbalance between windings because a parallel circuit is easily configured. Therefore, a degree of freedom of a motor design may be increased.

The above description is merely an example of the technological spirit of the present disclosure, and various modifications and variations may be made to those skilled in the art without departing from the essential characteristics of the present disclosure.

Therefore, the embodiments disclosed in the present disclosure are not intended to limit the technological spirit of the present disclosure, but to explain, and the scope of the technological spirit of the present disclosure is not limited by these embodiments.

The scope of the present disclosure needs to be construed according to the following claims, and all technological spirits within the equivalent range need to be construed as being included in the scope of the present disclosure.

INDUSTRIAL APPLICABILITY

The present disclosure may provide a motor assembly having two-phase input power.

The invention claimed is:

1. A two-phase motor assembly comprising:
a motor including a first winding and a second winding, the first winding and the second winding being arranged in parallel and electrically insulated from each other;
a DC-link circuit that is configured to supply a DC voltage and that includes a neutral point;
an inverter connected to the DC-link circuit and configured to convert the DC voltage into an AC voltage to drive the motor, the inverter including:
 a first switching device set connected to the first winding, and
 a second switching device set connected to the second winding; and
a controller configured to control the inverter,
wherein the controller is configured to operate a first phase of the motor using the neutral point and a half-bridge and operate a second phase of the motor using a full-bridge.

2. The two-phase motor assembly of claim 1, wherein currents applied from the inverter to the first winding and the second winding of the motor are asymmetrical.

3. The two-phase motor assembly of claim 1, wherein the motor does not include a neutral point.

4. The two-phase motor assembly of claim 1, wherein the controller includes:
a speed controller configured to generate a target current based on a speed of the motor; and
a torque controller configured to generate a torque command for the motor based on the target current, the torque controller being configured to adjust distribution of two-phase torque based on the speed of the motor.

5. The two-phase motor assembly of claim 4, wherein the torque controller is configured to, based on the motor being at a first speed or less, apply a torque command to each of the first phase and the second phase of the motor, the torque command having half of a torque requested by a load of the motor, and
wherein the torque controller is configured to, based on the motor being at the first speed or greater and being at a second speed or less, apply different torque commands to the first phase and the second phase, respectively.

6. The two-phase motor assembly of claim 5, wherein the torque controller is configured to perform weak field control on the first phase of the motor based on the motor being at up to a third speed, the third speed being higher than the first speed and lower than the second speed, and
wherein the torque controller is configured to apply a torque command to the second phase of the motor, the torque command being obtained by subtracting an output torque in the first phase from the torque requested by the load of the motor.

7. The two-phase motor assembly of claim 5, wherein the torque controller is configured to, based on the motor being at a speed higher than a third speed and equal to or lower than the second speed, turn off the first phase and apply a torque command to the second phase of the motor, the torque command corresponding to a torque of the load of the motor.

8. The two-phase motor assembly of claim 5, wherein the torque controller is configured to, based on the motor being at up to a fourth speed and greater than the second speed, turn off the first phase and perform weak field control on the second phase of the motor.

9. The two-phase motor assembly of claim 5, wherein the first speed is a maximum speed that corresponds to a maximum torque of the first phase of the motor or that reaches a current value corresponding to the maximum torque.

10. The two-phase motor assembly of claim 5, wherein the second speed is a maximum speed that corresponds to a maximum torque of the second phase of the motor or that reaches a current value corresponding to the maximum torque.

11. The two-phase motor assembly of claim 1, wherein the first switching device set includes a number of switching devices being different from a number of switching devices of the second switching device set.

12. The two-phase motor assembly of claim 11, wherein the first switching device set includes one pair of switching devices, and the second switching device set includes two pairs of switching devices.

13. The two-phase motor assembly of claim 1, wherein a phase difference between the first winding and the second winding of the motor is 90 degrees or 270 degrees.

14. A two-phase motor assembly comprising:
a motor including a first winding and a second winding, the first winding and the second winding having an electrically insulated parallel structure;
a DC-link circuit configured to supply a DC voltage;
an inverter connected to the DC-link circuit and configured to convert the DC voltage into an AC voltage to drive the motor, the inverter including:
 a first switching device set connected to the first winding, and
 a second switching device set connected to the second winding; and
a controller configured to control the inverter,
wherein the controller includes:
 a speed controller configured to generate a target current based on a speed of the motor; and
 a torque controller configured to generate a torque command for the motor based on the target current, the torque controller being configured to adjust distribution of two-phase torque based on the speed of the motor,
wherein the torque controller is configured to, based on the motor being at a first speed or less, apply a torque command to each of the first phase and the second phase of the motor, the torque command having half of a torque requested by a load of the motor, and
wherein the torque controller is configured to, based on the motor being at the first speed or greater and being at a second speed or less, apply different torque commands to the first phase and the second phase, respectively.

15. The two-phase motor assembly of claim 14, wherein the controller is configured to operate a first phase of the motor using the neutral point and a half-bridge, and wherein the controller is configured to operate a second phase of the motor using a full-bridge.

* * * * *